United States Patent
Phelps et al.

(10) Patent No.: US 8,908,840 B2
(45) Date of Patent: Dec. 9, 2014

(54) IVR RECORDING CONTINUITY CONTROL

(75) Inventors: David E. Phelps, Colorado Springs, CO (US); Brian S. Badger, Divide, CO (US); John Macedo, Clearwater, FL (US); Gregory J. Bjornberg, Colorado Springs, CO (US); John Rivera, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 212 days.

(21) Appl. No.: 13/323,087

(22) Filed: Dec. 12, 2011

(65) Prior Publication Data

US 2013/0148793 A1  Jun. 13, 2013

(51) Int. Cl.
*H04M 1/64* (2006.01)

(52) U.S. Cl.
USPC ..................... 379/88.25; 379/88.27

(58) Field of Classification Search
CPC . H04M 3/51; H04M 3/42221; H04M 1/6505; H04M 3/493
USPC ........... 379/88.08, 88.09, 88.11, 88.18, 88.22
See application file for complete search history.

(56) References Cited

U.S. PATENT DOCUMENTS

| | | | |
|---|---|---|---|
| 6,278,976 B1 * | 8/2001 | Kochian | 704/500 |
| 6,870,910 B1 * | 3/2005 | Armstrong et al. | 379/88.22 |
| 6,898,277 B1 * | 5/2005 | Meteer et al. | 379/265.02 |
| 6,970,554 B1 * | 11/2005 | Peterson et al. | 379/266.1 |
| 7,003,079 B1 * | 2/2006 | McCarthy et al. | 379/32.01 |
| 7,006,607 B2 * | 2/2006 | Garcia | 379/88.18 |
| 7,039,166 B1 * | 5/2006 | Peterson et al. | 379/88.18 |
| 7,542,902 B2 * | 6/2009 | Scahill et al. | 704/251 |
| 7,813,481 B1 * | 10/2010 | Hursey et al. | 379/68 |
| 8,135,115 B1 * | 3/2012 | Hogg et al. | 379/88.22 |
| 8,150,007 B2 * | 4/2012 | Didcock | 379/112.02 |
| 8,249,226 B2 * | 8/2012 | Lingafelt et al. | 379/88.22 |
| 8,494,126 B2 * | 7/2013 | Skinner | 379/88.18 |
| 2003/0007612 A1 * | 1/2003 | Garcia | 379/88.18 |
| 2003/0147512 A1 * | 8/2003 | Abburi | 379/88.22 |
| 2004/0131161 A1 * | 7/2004 | Schwartz et al. | 379/68 |
| 2006/0188075 A1 * | 8/2006 | Peterson | 379/67.1 |
| 2007/0041527 A1 * | 2/2007 | Tuchman et al. | 379/88.22 |
| 2008/0260116 A1 * | 10/2008 | Didcock | 379/88.18 |
| 2008/0301282 A1 * | 12/2008 | Coleman | 709/224 |
| 2011/0002451 A1 * | 1/2011 | Moran et al. | 379/88.22 |
| 2012/0148032 A1 * | 6/2012 | Blanchard et al. | 379/88.11 |
| 2012/0288069 A1 * | 11/2012 | Naparstek et al. | 379/88.01 |
| 2013/0083903 A1 * | 4/2013 | Peterson | 379/88.08 |
| 2013/0114801 A1 * | 5/2013 | Perlmutter | 379/88.04 |
| 2013/0266128 A1 * | 10/2013 | Blanchard et al. | 379/88.01 |

* cited by examiner

*Primary Examiner* — Fan Tsang
*Assistant Examiner* — Van D Huynh

(57) ABSTRACT

A computing device may establish a communication session with a user equipment device (UE). The computing device may interact with the UE via interactive voice response (IVR) services and enable a first portion of the communication session to be recorded using a first recording mode. The computing device may out-dial a second portion of the communication session and enable a second portion of the communication session to be recorded using a second recording mode. A recording mode may include recording a portion of a communication session locally, streaming a portion of the communication session to a recording system, or out-dialing a portion of the communication session to enable a communication session tap to be placed on the out-dialed portion of the communication session.

20 Claims, 10 Drawing Sheets

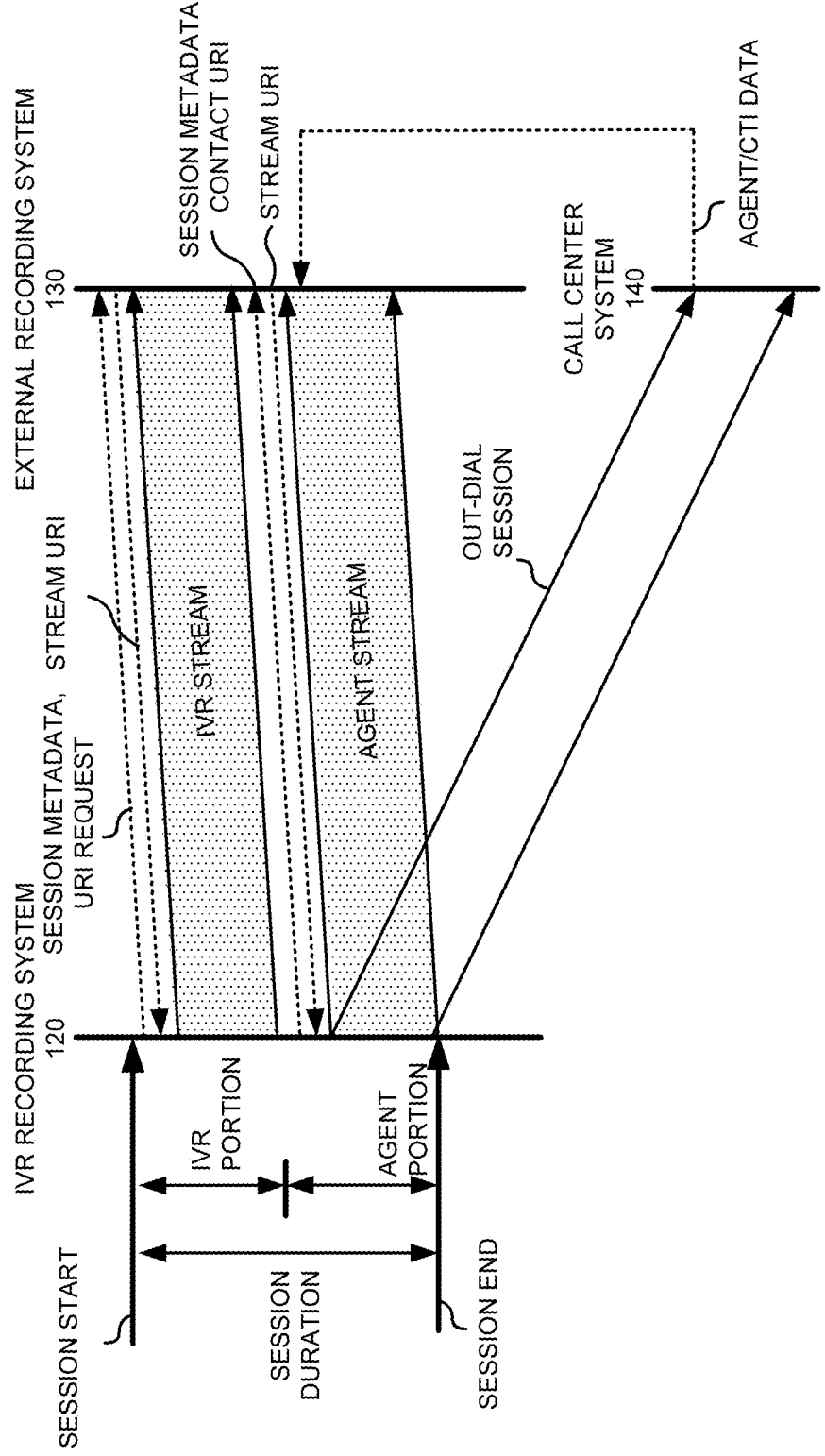

IVR RECORDING CONTINUITY CONTROL

BACKGROUND

Currently available telecommunication technologies enable individuals and organizations to communicate in a variety of ways. For example, many companies and other organizations maintain call centers that individuals may call to gain access to customer service, sales support, product support, technical support, or other types of services. Some call center services include an automated component capable of providing callers with basic services and information, and an agent component for more complex or personalized information and services. Additionally, some call centers attempt to ensure quality control by monitoring or recording calls. However, such attempts often include several deficiencies. Examples of such deficiencies include an inability to record automated portions of a call, maintain recording continuity between an automated portion of a call and an agent portion of a call, or an inability to extend current recording capabilities to additional call centers or call center offices in different locations.

BRIEF DESCRIPTION OF THE DRAWINGS

FIGS. 6-10 are diagrams of examples of communication session recording solutions according to one or more implementations described herein.

DETAILED DESCRIPTION OF PREFERRED EMBODIMENTS

The following detailed description refers to the accompanying drawings. The same reference numbers in different drawings may identify the same or similar elements.

In one or more implementations, described herein, devices may be used to, for example, record automated and agent portions of a communication session (e.g., a call session, a telephone call, etc.). In certain implementations, an IVR recording system may establish a communication session with a user equipment device (UE). The IVR recording system may enable an IVR portion of the communication session to be recorded. The IVR recording system may also, or alternatively, out-dial an agent portion of a communication session and/or enable the agent portion of the communication session to be recorded. The recordings of the IVR portion and agent portion of the communication session may be stored in a recording system.

Figure 1:
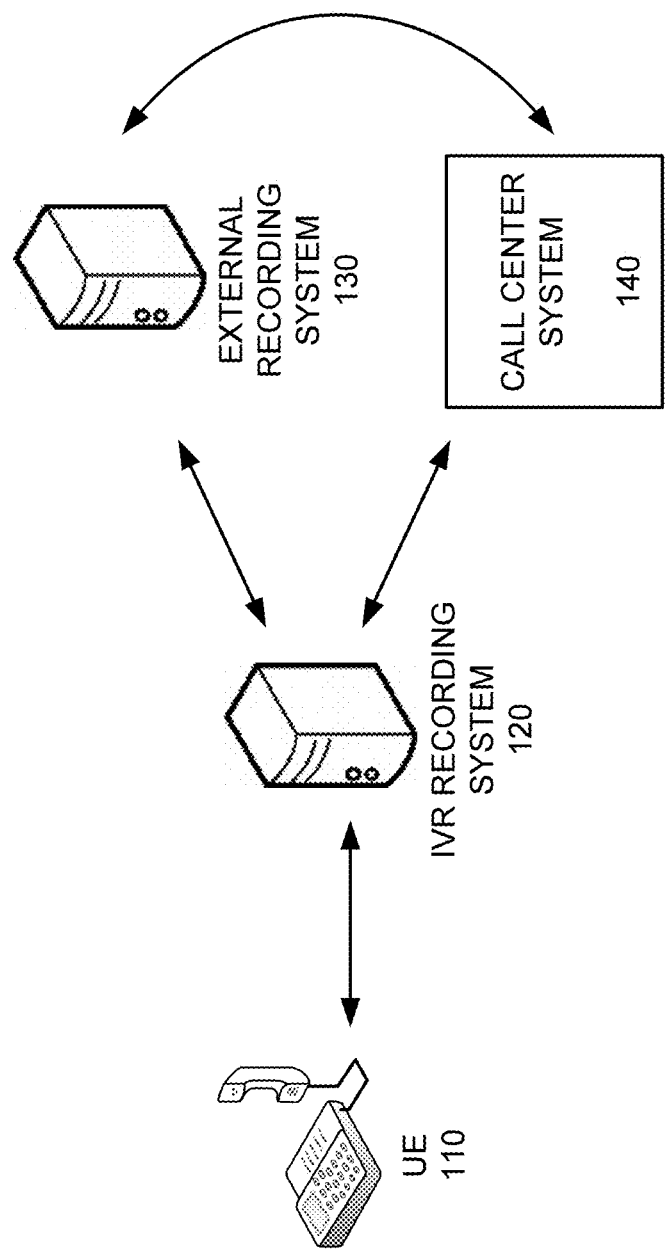
FIG. 1 is a diagram of an overview of an implementation described herein.

FIG. 1 is a diagram of an overview 100 of an implementation described herein. As illustrated, overview 100 may include UE 110, IVR recording system 120, external recording system 130, or call center system 140. In some implementations, one or more of the depicted systems or devices may correspond to systems or devices discussed elsewhere in this specification.

UE 110 may include one or more of a variety of computing devices capable of operating in a network environment. For example, UE 110 may include a telephone, a mobile telephone, a computer, or another type of computing device. UE 110 may be capable of establishing a communication session with IVR recording system 120.

IVR recording system 120 may include one or more of variety of computing devices. For example, IVR recording system 120 may include a computer, a server, a cluster of servers, or one or more other types of computing devices. IVR recording system 120 may be capable of establishing a communication session with UE 110. In some implementations, IVR recording system 120 may provide IVR services during a communication session, which may include sending and receiving data or other information from UE 110. For example, IVR recording system 120 may send an audio message, a graphical message, a multimedia message, or other type of message to UE 110 that prompts a user of UE 110 to answer a question, make a selection, or otherwise input data that will be received by IVR recording system 120.

IVR recording system 120 may enable a communication session, or portion thereof, to be recorded according to one or more recording modes. For example, IVR recording system 120 may enable a communication session to be recorded by recording the communication session locally and communicating the recorded communication session to external recording system 130. In another example, IVR recording system 120 may enable a communication session to be recorded by establishing a connection with external recording system 130 and streaming the communication session to external recording system 130.

In yet another example, IVR recording system 120 may enable a communication session to be recorded by out-dialing the communication session to call center system 140. Out-dialing a communication session may include a various operations (e.g., a dial-out operation, a forwarding operation, a call session patching operation, etc.) capable of placing UE 110 in communication with call center system 140. Additionally, or alternatively, out-dialing a communication session may cause a communication session tap to be placed on the communication session, which may enable the communication session to be recorded by external recording system 130. Accordingly, recording modes, as discussed herein, may include recording a communication session locally, streaming a communication session to external recording system 130, causing a communication session tap to be placed on the communication session, or one or more other operations that enable a communication session, or portion thereof, to be recorded.

A communication session tap may include any variety of telephone tapping, splitting, forking, or routing operations capable of enabling external recording system 130 to record the communication session. In some implementations, a communication session tap may be placed on an out-dialed communication session by IVR recording system 120, external recording system 130, or call center system 140. However, in other implementations, the communication session tap may be placed on an out-dialed communication session by another system or device (not shown). For example, in some implementations, one or more of the systems, devices, operations, and/or services of IVR recording system 120, as described herein, may be incorporated into an already existing communication management system, and the communication management system may be capable of placing a communication session tap on an out-dialed communication session.

External recording system 130 may include one or more of variety of computing devices capable of operating in a network environment. For example, recording system 120 may include a computer, a server, a cluster of servers, or other types of computing devices capable of network communications. Similarly, call center system 140 may include one or more of a variety of computing devices, including a telephone, a computer, a server, or other types of computing devices. In some implementations, call center system 140 may communicate communication session data to external recording system 130 to assist with recording a communication session.

Figure 2:
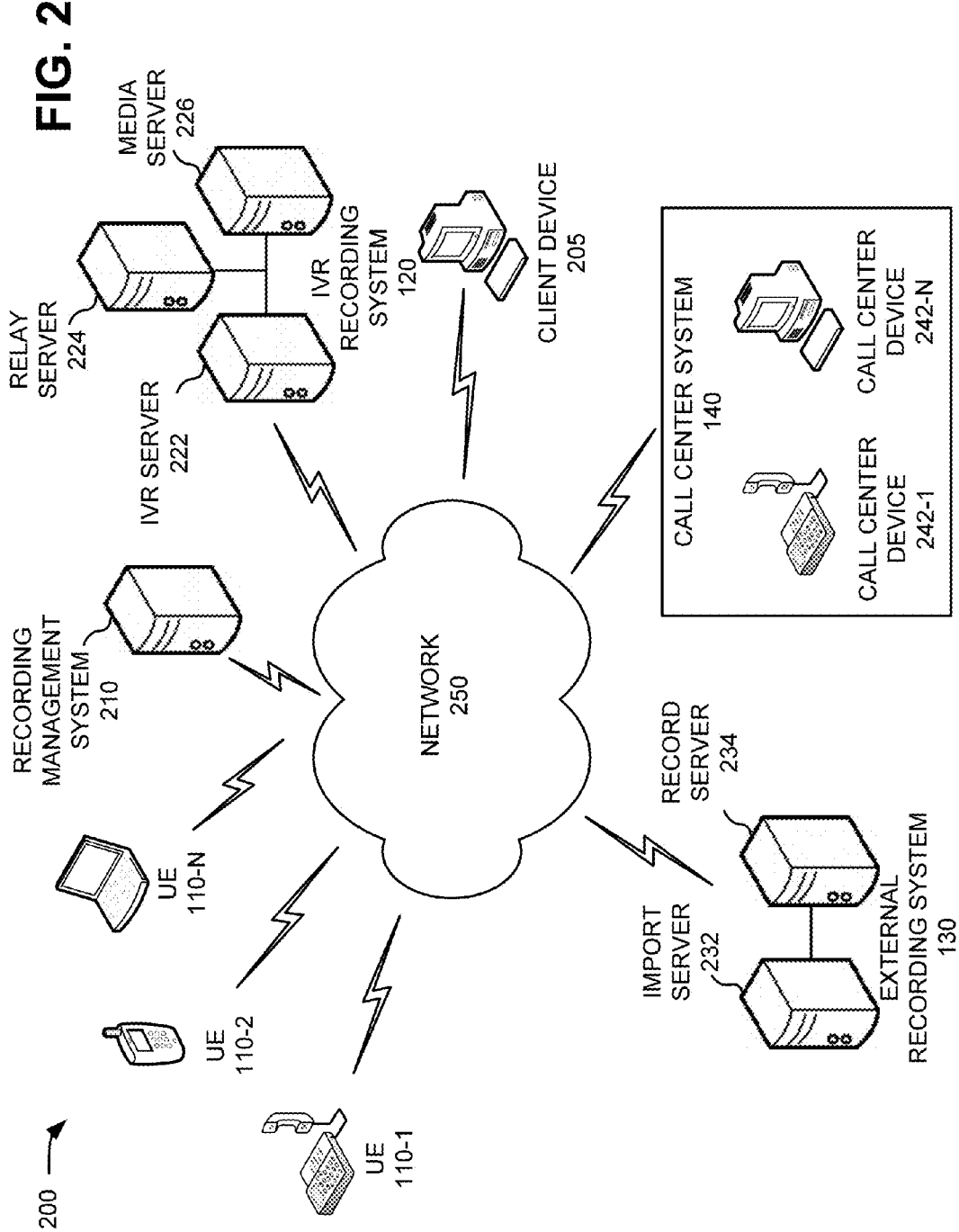
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 205, recording management server 210, UEs 110-1, 110-2, . . . , 110-N (where N≥1) (collectively referred to as "UEs 110," and individually as "UE 110"), IVR recording system 120, external recording system 130, call center system 140, and network 250. While FIG. 2 shows a particular number and arrangement of systems, networks, and devices, in alternative implementations, environment 200 may include additional systems, networks or devices, fewer systems, networks or devices, different systems, networks or devices, or differently arranged systems, networks or devices than those depicted. Moreover, one or more systems, networks, or devices may perform a task described as being performed by another system, network, or device.

Client device 205 may include one or more of a variety of computing or communication devices. For instance, client device 205 may include a smart phone, a laptop computer, a tablet computer, a desktop computer, a personal data assistant (PDA), and/or another type of computing or communication device. Client device 205 may be capable of operating in a manner that is consistent with the systems, environments, devices, processes, and operations described herein. For example, client device 205 may communicate record orders (e.g., instructions to record one or more communication sessions or one or more types of communication sessions) to recording management system 210. Client device 205 may also, or alternatively, be capable of receiving recording information from recording management system 210.

Recording management system 210 may include one or more of a variety of computing or communication devices. For example, recording management system 210 may include a desktop computer, a server, a cluster of servers, or another type of computing or communication device. In some implementations, for example, recording management system 210 may include a transaction server, a storage device that stores record metadata and/or record data, a web server, and/or one or more other types of computing or communication devices. Additionally, or alternatively, recording management server 210 may be capable of operating in a manner that is consistent with the systems, environments, devices, processes, and operations described herein. For instance, recording management system 210 may receive record orders from client device 205, communicate record orders to IVR recording system 120, monitor record orders, provide client device 205 with record order updates, and perform other functions or operations described herein.

UE 110 may include a variety of computing devices. For example, UE 110 may include a telephone, a smart phone, a laptop computer, a tablet computer, a desktop computer, a personal data assistant (PDA), and/or another type of computing or communication device. UE 110 may call or otherwise establish a communication session with IVR recording system 120 via network 250.

IVR recording system 120 may include a computer, a server, a cluster of servers, or another type of computing or communication device. For example, as illustrated, IVR recording system 120 may include IVR server 222, relay server 224, and media server 226. IVR server 222 may, for example, provide IVR services to communication sessions and/or provide other services relating to communication sessions. Relay server 224 may, for example, provide various services, such as recording communication sessions, communicating communication session recordings to external recording system 130, streaming communication sessions to external recording system 130, and/or updating IVR server 222 with requests to record communication sessions (e.g., record orders or call orders). Relay server 224 may also provide additional services, including cooperating with IVR server 222 to establish recordable communication sessions, collecting usage information for billing purposes, or other services. Media server 226b may provide audio tracks and/or other types of media for IVR services.

IVR recording system 120 may enable a communication session, or portion thereof, to be recorded. For example, IVR recording system 120 may enable a communication session to be recorded by recording the communication session locally and communicating the recorded communication session to external recording system 130. In another example, IVR recording system 120 may enable a communication session to be recorded by establishing a connection with external recording system 130 and streaming the communication session to external recording system 130.

In another example, IVR recording system 120 may enable a communication session to be recorded by out-dialing the communication session to call center system 140. Out-dialing a communication session may include various operations (e.g., a dial-out operation, a forwarding operation, a call session patching operation, etc.) capable of placing UE 110 in communication with call center system 140. Additionally, or alternatively, out-dialing a communication session may cause a communication session tap to be placed on the communication session, which may enable the communication session to be recorded by external recording system 130. IVR recording system 120 may include an Internet Protocol (IP) IVR recording system or an IVR recording system based on another type of technology such as an IVR recording system connected to a public switched telephone network (PSTN) communication system.

External recording system 130 may include computing devices, such as a computer, a server, a cluster of servers, or another type of computing device. Additionally, or alternatively, external recording system 130 may include a router, a switch, a modem, a LAN, a virtual network, a wireless network, or other types of networks and/or network devices. For instance, as illustrated, external recording system 130 may include import server 232 and record server 234. Import server 234 may be capable of receiving data, corresponding to a communication session, from IVR recording system 120 and/or call center system 140. Examples of such data may include non-transitory data structures, such as record metadata, record data, and/or other call-related information.

Record server 234 may be capable of receiving and recording a data stream corresponding to a communication session from IVR recording system 120. In some implementations, record server 236 may also, or alternatively, communicate with IVR server 222 to establish a routing path for communicating the data stream from IVR recording system 120. In certain implementations, record server 236 may also, or alternatively, communicate with IVR recording system 120 to specify a time, a protocol, a manner, a form, or a format for communicating a data stream of a communication session.

Call center system 140 may include one or more of a variety of networks and/or devices. For example, call center system 140 may include a computer, a server, a cluster of servers, a telephone, a cellular telephone, a router, a switch, a local area network (LAN), a wireless network, a virtual network, or another type of network or device. As depicted, call center system 140 may also, or alternatively, include call center devices 242-1, . . . , 242-M (where M≥1) (collectively referred to as "call center devices 242," and individually as "call center device 242"), including computers, telephones, and other devices, which may be used by agents of call center system 140 to receive and service out-dialed communication sessions from IVR recording system 120. Call center system 140 may be a single call center located in a single geographic area and/or multiple call centers distributed across a geographic area.

Network 250 may be any type of network or combination of networks. For example, network 250 may include a LAN, a wide area network (WAN) (e.g., the Internet), and/or a telecommunications network (e.g., Long-Term Evolution (LTE) network, Global System for Mobile Communications (GSM) network, wideband code division multiple access (WCDMA) network, Universal Mobile Telecommunications System (UMTS) network, Code Division Multiple Access 2000 (CDMA2000) network, High-Speed Packet Access (HSPA) network, Worldwide Interoperability for Microwave Access (WiMax) network, etc.).

Additionally, or alternatively, network 250 may include a fiber optic (e.g., a FiOS) network, a metropolitan area network (MAN), an ad hoc network, a telephone network (e.g., a PSTN), a cellular network, or a voice over internet protocol (Voice over IP, VoIP) network. Network 250 may also, or alternatively, include additional networks, systems, devices, and/or other technologies to enable communications between client device 205, recording management system 210, UEs 110, IVR recording system 120, external recording system 130, and/or call center system 140.

Figure 3:
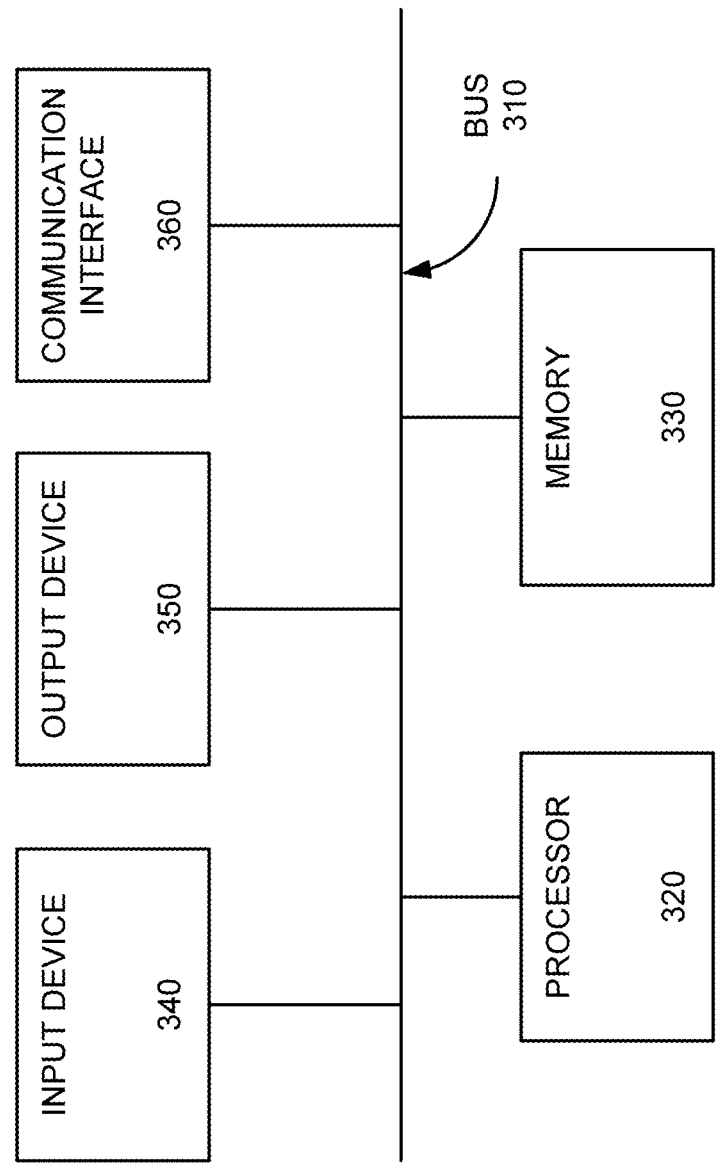
FIG. 3 is a diagram of example components of a device that may be used within the environment of FIG. 2.

FIG. 3 is a diagram of example components of a device 300 that may be used within environment 200 of FIG. 2. Device 300 may correspond to one or more of client device 205, recording management system 210, UE 110, IVR server 222, relay server 224, media server 226, import server 232, record server 234, and/or call center device 242. For example, in some implementations, client device 205, recording management system 210, UE 110, IVR server 222, relay server 224, media server 226, import server 232, record server 234, and/or call center device 242 may each include the components of FIG. 3; however, in other implementations, the components of FIG. 3 may be used to implement a combination of client device 205, recording management system 210, UE 110, IVR server 222, relay server 224, media server 226, import server 232, record server 234, and/or call center device 242. Further, each of client device 205, UE 110, IVR server 222, relay server 224, media server 226, import server 232, record server 234, and/or call center device 242 may include one or more devices 300.

As depicted, device 300 may include bus 310, processor 320, memory 330, input device 340, output device 350, or communication interface 360. However, the precise components of device 300 may vary between implementations. For example, depending on the implementation, device 300 may include fewer components, additional components, different components, or differently arranged components than those illustrated in FIG. 3.

Bus 310 may include one or more component subsystems and/or communication paths that enable communication among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks (e.g., network 250). For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
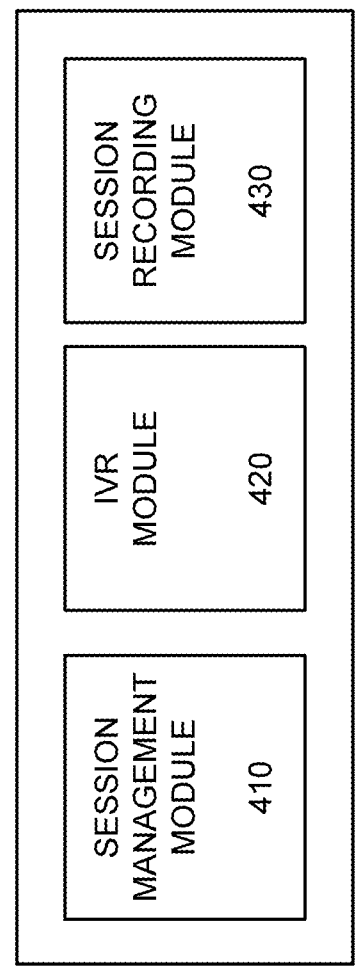
FIG. 4 is a diagram of example functional components of an interactive voice response (IVR) system according to one or more implementations described herein.

FIG. 4 is a diagram of example functional components of IVR recording system 120. As illustrated, IVR recording system 120 may include session management module 410, IVR module 420, or session recording module 430.

Depending on the implementation, one or more of the modules 410-430 may be implemented as a combination of hardware and software based on the components illustrated and described with respect to FIG. 3. Alternatively, modules 410-430 may each be implemented as hardware based on the components illustrated and described with respect to FIG. 3. While FIG. 4 shows a particular number and arrangement of modules, in alternative implementations, IVR recording system 120 may include additional modules, fewer modules, different modules, or differently arranged modules than those depicted.

For example, in some implementations, each of the modules 410-430 may be implemented by, or otherwise correspond to, IVR server 222. However, in other implementations, the modules 410-430 may be distributed amongst IVR server 222, relay server 224, media server 226, and/or other devices or components of IVR recording system 120. In yet other implementations, a portion of one or more of the modules 410-430 may be implemented by, for example, IVR server 222, while another portion of the same module may be implemented by relay server 224, media server 226, or other devices or components of IVR recording system 120.

Session management module 410 may provide functionality with respect to establishing and managing a communication session. For example, session management module 410 may enable IVR recording system 120 to establish, manage, monitor, or terminate a communication session. In some implementations, session management module 410 may cause and/or enable IVR recording system 120 to determine whether the communication session, or a portion thereof, will be recorded by IVR recording system 120 (e.g., recorded locally) or streamed to external recording system 130. Session management module 410 may also, or alternatively, enable IVR recording system 120 to out-dial a communication session to call center system 140. In an out-dial scenario, session management module 410 may act as an intermediary for the communication session by, for example, providing a data path or a route between UE 110 and call center system 140.

In some implementations, session management module 410 may also, or alternatively, maintain control of an out-dialed communication session. For example, session management module 410 may cause a data stream of a communication session to be split, fork, or otherwise create a duplicate data stream corresponding to the communication session. As another example, session management module 140 may terminate an out-dialed communication session, which may include the termination of a communication session tap placed on the communication session. In some implementations, session management module 410 may enable IVR recording system 120 to capture or produce session metadata regarding a session invitation, a communication session, or an out-dialed communication session. Examples of such session metadata may include a telephone number of UE 110, a number dialed by UE 110, information entered by a user of UE 110, a communication session duration, an out-dial number, an out-dial time, or other types of information.

IVR module 420 may enable IVR services. For example, IVR module 420 may enable IVR recording system 120 to interact with UE 110 by sending and/or receiving communication session data from UE 110. A description of IVR services is provided above.

Session recording module 430 may provide functionality with respect to recording and/or streaming a communication session. For example, session recording module 430 may enable IVR recording system 120 to record a communication session locally. In some implementations, whether session recording module 430 records a communication session, or portion thereof, may be based on a record order or other request or command, which may be received from another device, such as client device 205, recording management system 210, and/or one or more other types of devices.

Additionally, or alternatively, session recording module 430 may enable IVR recording system 120 to perform various operations corresponding to a communication session, including an operation to start recording a communication session, stop recording a communication session, specify a file format for recording the communication session, identify a location for storing the recorded communication session, or other types of operations. In some implementations, the IVR server 120 may perform one or more of the foregoing operations based on one or more commands, requests, or instructions received from another device, such as client device 205, recording management system 210, and/or one or more other types of devices.

Additionally, or alternatively, session recording module 430 may enable IVR recording system 120 to receive a record order, a record plan, a record rule, or a record policy for recording a communication session. A record order, a record plan, a record rule, or a record policy may each include one or more requests to record communication sessions that satisfy a condition or scenario, such as communication sessions involving a particular type of UE 110, communication sessions established during a specified time interval, communication sessions originating from a specified geographic location, or other types of conditions or scenarios.

Figure 5:
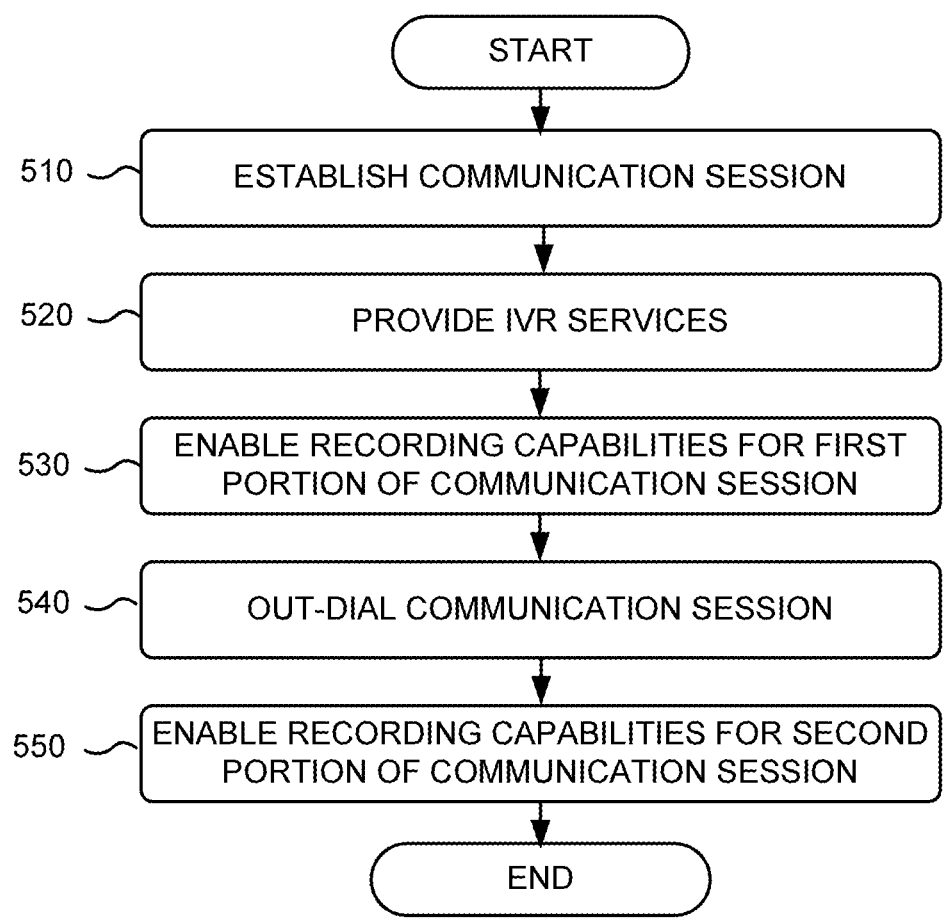
FIG. 5 is a diagram of an example process for recording a communication session according to one or more implementations described herein.

FIG. 5 is a flowchart diagram of an example process 500 for recording a communication session according to one or more implementations described herein. In one or more implementations, process 500 may be performed by one or more components of IVR recording system 120. In other implementations, one or more blocks of process 500 may be performed by one or more other components/devices, or a group of components/devices, including or excluding IVR recording system 120.

Process 500 may include establishing a communication session (block 510). For example, IVR recording system 120 may establish a communication session with UE 110. In some implementations, the communication session may be initiated by UE 110. In other implementations, the communication session may be initiated by IVR recording system 120.

IVR services may be provided (block 520). For example, IVR recording system 120 may provide IVR services to UE 110. In some implementations, IVR recording system 120 may provide IVR services by communicating communication session data to UE 110. In some implementations, IVR recording system 120 may provide IVR services by receiving, recognizing, and/or interpreting communication session data from UE 110. In some implementations, IVR recording system 120 may provide IVR services by interacting with UE 110, which may include both communicating communication session data to UE 110 and receiving, recognizing, and/or interpreting communication session data from UE 110.

Recording capabilities for a first portion of a communication session may be enabled (block 530). For instance, IVR recording system 120 may enable a first portion of a communication session, such as an IVR portion, to be recorded. In some implementations, this may include IVR recording system 120 recording a first portion of the communication session and communicating the recording to external recording system 130, which may include IVR recording system 120 setting-up, designating, or otherwise establishing, a recording route for the communication session to be recorded locally. In some implementations, IVR recording system 120 may enable a first portion of a communication session to be recorded by streaming the communication session to external recording system 130.

A communication session may be out-dialed (block 540). For example, IVR recording system 120 may out-dial a communication session to call center system 140. In certain implementations, IVR recording system 120 may out-dial a communication session based on communication session data received from UE 110. For instance, IVR recording system 120 may out-dial a communication session in response to a request from UE 110 to speak with an operator or customer service representative, or in response to an unrecognized input from UE 110 (e.g., a credit card number not recognized by IVR recording system 120). In some implementations, IVR recording system 120 may out-dial a communication session based on other factors, including an expiration of a time interval (e.g., when a caller has been interacting with IVR recording system 120 for too long) or an input from external recording system 130 (e.g., an input from an individual monitoring or listening to the communication session via client device 205, recording management system 210, and/or one or more other types of devices).

Recording capabilities for a second portion of a communication session may be enabled (block 550). For instance, IVR recording system 120 may enable a second portion of a communication session, such as an out-dialed portion, to be recorded. As mentioned above with respect to the recording of the first portion, enabling the recording of the second portion may include IVR recording system 120 recording an out-dialed portion of the communication session locally and communicating the recorded communication session to external recording system 130. Similarly, IVR recording system 120 may enable a second portion of a communication session to be recorded by streaming the second portion of the communication session to external recording system 130. Additionally, or alternatively, IVR recording system 120 may enable a second portion of a communication session to be recorded by out-dialing the communication session to call center system 140 and notifying external recording system 130 of the out-dialing of the communication session. In such implementations, external recording system 130 may, in turn, create a communication session tap, directed to external recording system 130, for the out-dialed communication session.

While FIG. 5 shows a flowchart diagram of an example process 500 for recording a communication session, in other implementations, a process for recording a communication session may include fewer operations, different operations, differently arranged operations, or additional operations than depicted in FIG. 5. For example, in some implementations, process 500 may include a single operation for enabling a communication session to be recorded, while in other implementations, process 500 may include additional operations for enabling the recording of additional portions (e.g., third, fourth, or fifth portions) of a communication session. In yet other implementations, process 500 may include an operation for determining whether a communication session, or portion thereof, should be recorded. Additionally, or alternatively, process 500 may include an operation for determining how to record the communication call session or portion thereof.

Figure 6:
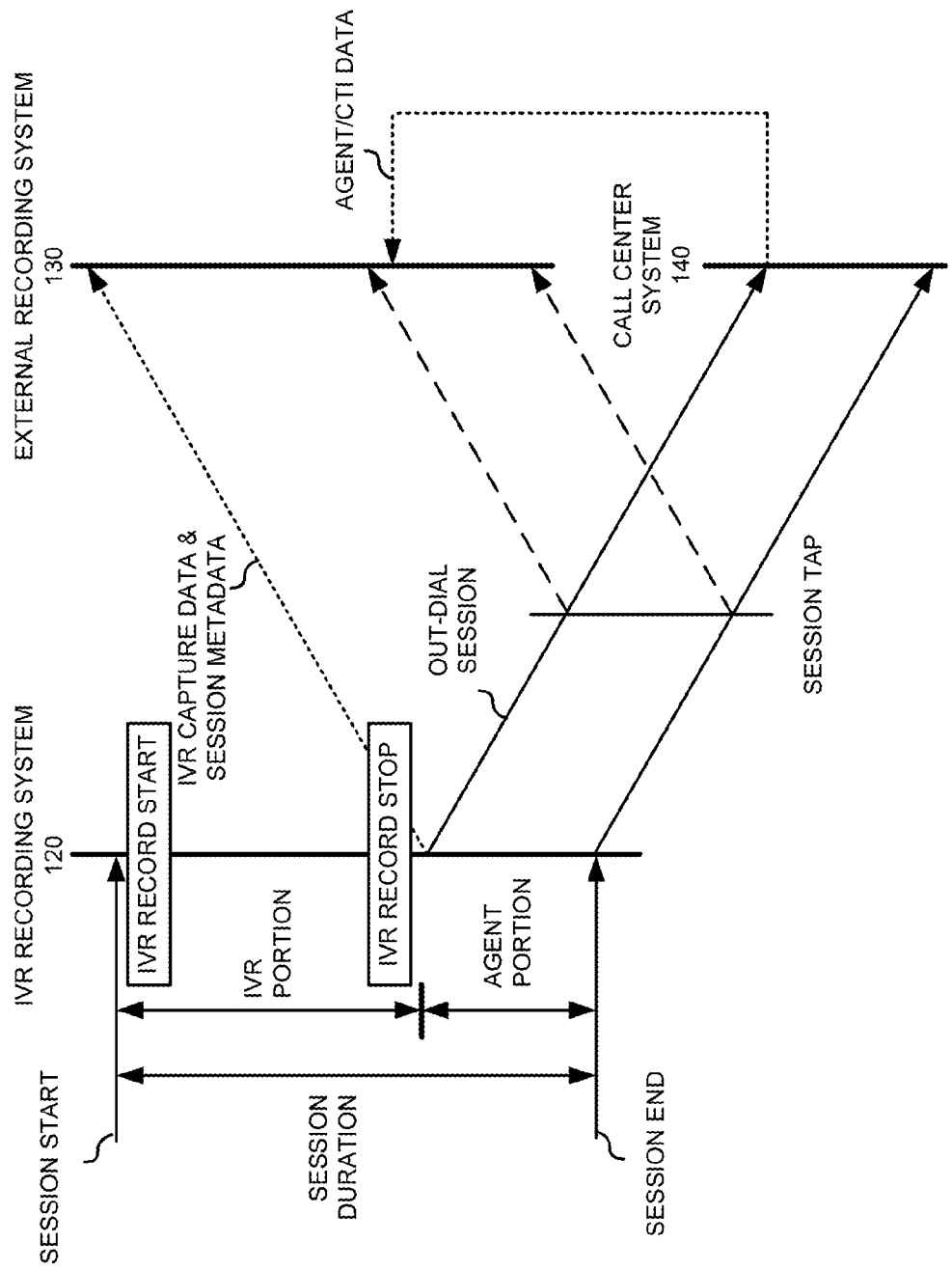

FIG. 6 is a diagram of an example of a communication session recording solution 600 according to one or more implementations described herein. While FIG. 6 shows a particular number and arrangement of systems, in alternative implementations, communication session recording solution 600 may include additional systems, fewer systems, different systems, or differently arranged systems than those depicted. For instance, communication session recording solution 600 may also include UE 110, recording management system 210, client device 205, or one or more other types of systems or devices.

As illustrated, IVR recording system 120 may begin recording an IVR portion of a communication session at, or near, the start of the communication session. The IVR portion may include IVR recording system 120 providing interactive IVR services to UE 110 of the communication session. At, or near, the end of the IVR portion, IVR recording system 120 may stop recording the communication session, generate IVR capture data and metadata, or communicate the IVR capture data and session metadata to external recording system 130. The IVR capture data may include the recorded IVR portion of the communication session, and the session metadata may include information describing, or relating to, the communication session. For example, session metadata may include call time data (e.g., a time corresponding to the beginning of the communication session), call duration data (e.g., a duration of time corresponding to the IVR portion of the communication session), automatic number identification (ANI) data (e.g., a telephone number of the UE 110), dialed number identification service (DNIS) data (e.g., a number dialed by UE 110 to establish the communication session), out-dial data (e.g., a telephone number of call center system 140), IVR input or output data (e.g., communication session data received from UE 110 or provided to UE 110 during the IVR portion of the communication session), communication session identifier data (e.g., information identifying the communication session), or other data describing, or relating to, the communication session.

IVR recording system 120 may also out-dial an agent portion of the communication session to call center system 140. As depicted, out-dialing the communication session may trigger, prompt, or otherwise cause, a communication session tap to be placed on the out-dialed communication session. As described above, the communication session tap may be placed on the out-dialed communication session by one or more of a variety of systems and/or devices, including external recording system 130. In the illustrated example, the communication session tap is directed to external recording system 130 so that external recording system 130 may record the agent portion of the communication session. At or near the beginning of the out-dialed communication session, call center system 140 may communicate agent/CTI data to external recording system 130.

Agent/CTI data may include information relating to the agent portion of the communication session, such as call time data, call duration data, agent identifier data (e.g., information identifying one or more agents of call center system 140), data entered into call center system 140 by the agent during the communication session, communication session identifier data (e.g., information identifying the communication session (which may correspond to the communication session identifier data discussed above with respect to the IVR portion of the communication session)), or other data relating to the communication session. The communication session, including the out-dialed communication session and the communication session tap, may end when IVR recording system 120 terminates the communication session.

As discussed above, while FIG. 6 shows a particular number and arrangement of operations, in alternative implementations, communication session recording solution 600 may include additional operations, fewer operations, different operations, or differently arranged operations than those depicted. For example, in some implementations, IVR recording system 120 may communicate a message to call management system 239 in order to prompt session management server 239 to place the communication session tap on the out-dialed communication session. Additionally, or alternatively, IVR recording system 120, external recording system 130, and/or call center system 140 may use CTI messages for communicating with one another. A CTI message may include a variety of data structures capable of including computer-telephone information, such as the session metadata or agent/CTI data described above.

Figure 7:
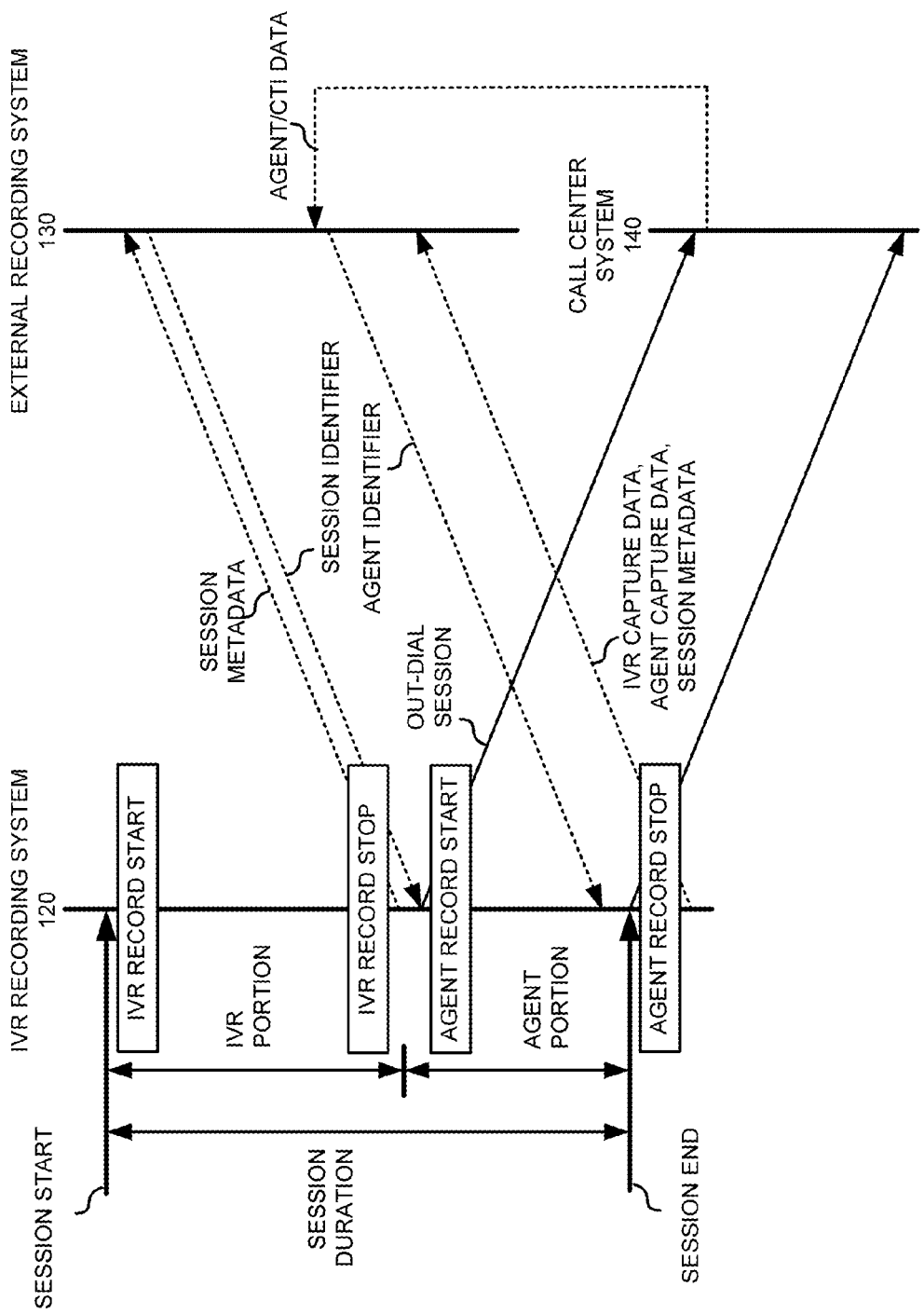

FIG. 7 is a diagram of another example of a communication session recording solution 700 according to one or more implementations described herein. While FIG. 7 shows a particular number and arrangement of systems, in alternative implementations, communication session recording solution 700 may include additional systems, fewer systems, different systems, or differently arranged systems than those depicted. For instance, communication session recording solution 700 may also include UE 110, recording management system 210, client device 205, or one or more other types of systems or devices.

As illustrated, IVR recording system 120 may begin recording an IVR portion of a communication session at, or near, the start of the communication session. As mentioned above, the IVR portion may include IVR recording system 120 providing interactive IVR services to UE 110 of the communication session. At, or near, the end of the IVR portion, IVR recording system 120 may stop recording the communication session and/or communicate session metadata, such as a telephone number of call center system 140, to external recording system 130. In response, IVR recording system 120 may receive a communication session identifier from external recording system 130 and out-dial the communication session to call center system 140. At or near the beginning of the agent portion of the communication session, IVR recording system 120 may begin again to record the communication session. Call center system 140 may communicate agent/CTI data to external recording system 130.

As depicted, external recording system 130 may communicate an agent identifier to IVR recording system during the out-dial portion of the communication session. The agent identifier may be based on the agent/CTI data received by external recording system 130 from call center system 140. At or near the end of the agent portion of the communication session, IVR recording system 120 may terminate the communication session, stop recording the communication session, or communicate IVR capture data, agent capture data, or session metadata to external recording system 130. The IVR capture data may include the recorded IVR portion of the communication session, and/or the agent capture data may include the recorded agent portion of the communication session. The session metadata may include information describing, or relating to, the communication session. For example, the session metadata may include call time data, call duration data, ANI data, DNIS data, out-dial data, IVR input or output data, communication session identifier data, agent identifier data, or other data describing, or relating to, the communication session As discussed above, while FIG. 7 shows a particular number and arrangement of operations, in alternative implementations, communication session recording solution 1300 may include additional operations, fewer operations, different operations, or differently arranged operations than those depicted. For example, in some implementations, IVR recording system 120, external recording system 130, and/or call center system may use CTI messages for communicating the data and messages discussed above.

Figure 8:
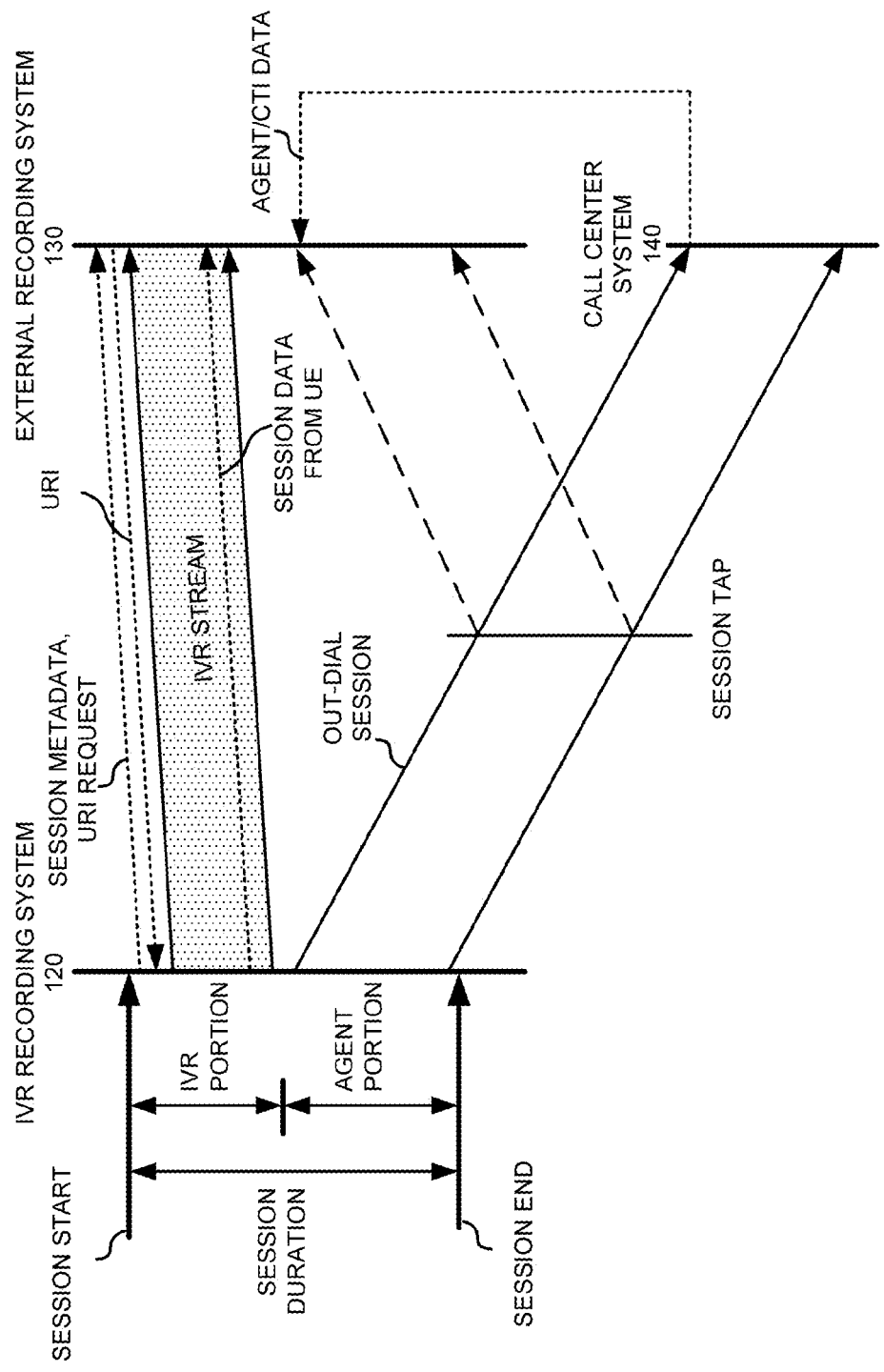

FIG. 8 is a diagram of another example of a communication session recording solution 800 according to one or more implementations described herein. While FIG. 8 shows a particular number and arrangement of systems, in alternative implementations, communication session recording solution 800 may include additional systems, fewer systems, different systems, or differently arranged systems than those depicted. For instance, communication session recording solution 800 may also include UE 110, recording management system 210, client device 205, or one or more other types of systems or devices.

As illustrated, at or near the beginning of a communication session, IVR recording system 120 may communicate session metadata and a URI request to external recording system 130. Session metadata is described above. A URI request may include a request for a resource identifier (e.g., a uniform resource location (URL) or a uniform resource name (URN)) for streaming the communication session to external recording system 130. Upon receiving a URI, as requested, IVR recording system 120 may begin streaming an IVR portion of the communication session to external recording system 130. IVR recording system 120 may communicate communication session data received from UE 110 to external recording system 130. In some implementations, IVR recording system 120 may use a SIP INFO message to communicate the communication session data from UE 110 to external recording system 130. As mentioned above, communication session data from UE 110 may include, for example, data received from a user of UE 110 in response to a prompt for information from IVR recording system 120.

Additionally, as described above with respect to FIG. 6, IVR recording system 120 may out-dial an agent portion of the communication session to call center system 140. Out-dialing the communication session may prompt a communication session tap to be placed on the out-dialed communication session. In some implementations, the communication session tap may be placed on the out-dialed communication session by call management system 239. As illustrated, the communication session tap may be directed to external recording system 130 so that external recording system 130 may record the agent portion of the communication session. At or near the beginning of the agent portion of the communication session, call center system 140 may communicate agent/CTI data to external recording system 130. At or near the end of the communication session, the agent portion of the communication session and the corresponding communication session tap may be terminated.

As discussed above, while FIG. 8 shows a particular number and arrangement of operations, in alternative implementations, communication session recording solution 800 may include additional operations, fewer operations, different operations, or differently arranged operations than those depicted. For example, in some implementations, IVR recording system 120 may communicate a message to call management system 239 in order to prompt call management system 239 to place the communication session tap on the out-dialed communication session. Additionally, in some implementations, IVR recording system 120, external recording system 130, and/or call center system may use CTI messages for communicating the data and messages discussed above.

Figure 9:
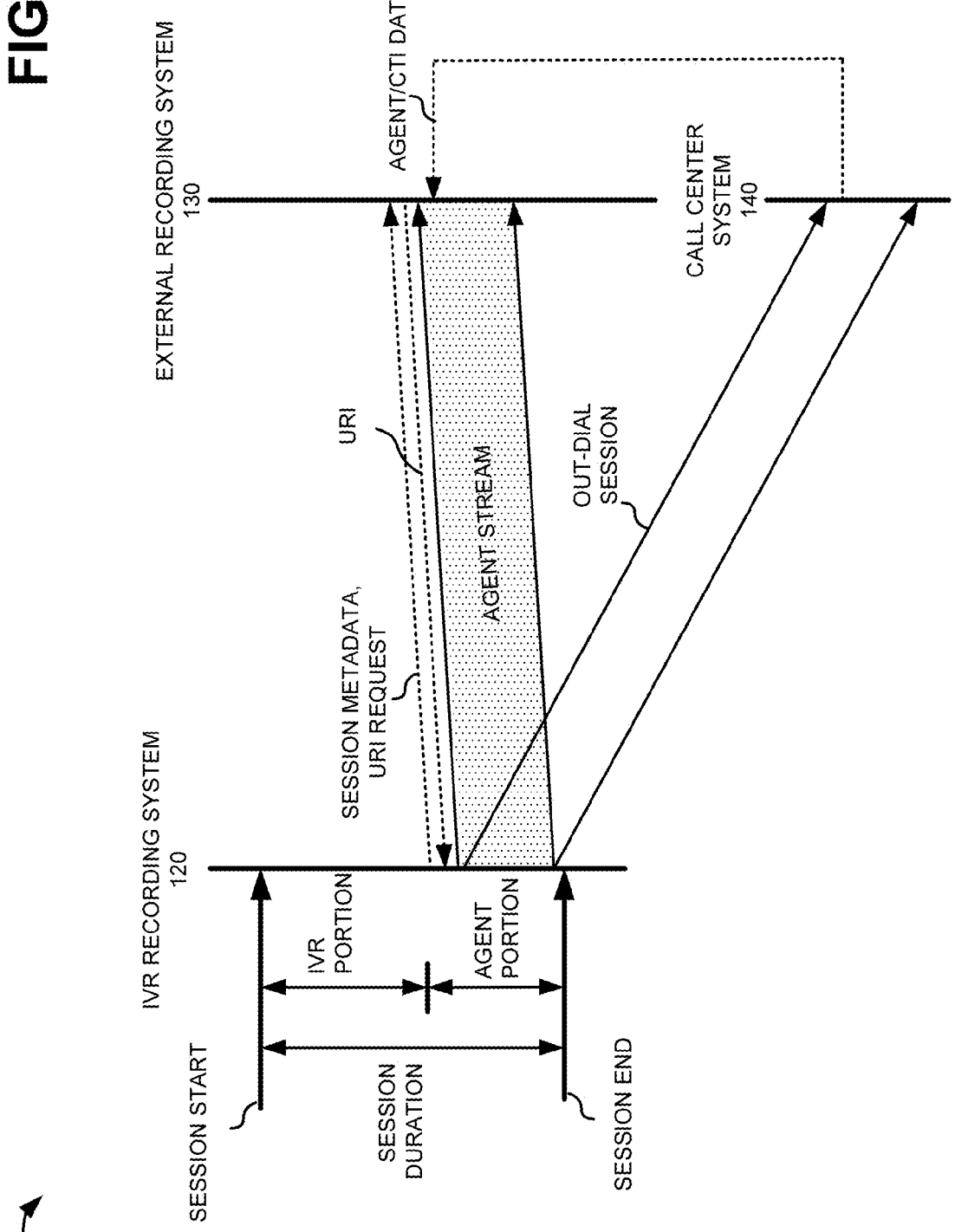

FIG. 9 is a diagram of another example of a communication session recording solution 900 according to one or more implementations described herein. While FIG. 9 shows a particular number and arrangement of systems, in alternative implementations, communication session recording solution 900 may include additional systems, fewer systems, different systems, or differently arranged systems than those depicted. For instance, communication session recording solution 900 may also include UE 110, recording management system 210, client device 205, or one or more other types of systems or devices.

As illustrated, IVR recording system 120 may provide a communication session with IVR services at or near the beginning of the communication session. At or near the beginning of an agent portion of the communication session, IVR recording system 120 may communicate session metadata and a URI request to external recording system 130, and/or external recording system 130 may respond by providing the requested URI. As depicted, IVR recording system 120 may stream the agent portion of the communication session to the external recording system 130. Additionally, IVR recording system 120 may out-dial the communication session to call center system 140. At or near the beginning of the agent portion of the communication session, call center system 140 may communicate agent/CTI data to external recording system 130. Since IVR recording system 120 may act as a session intermediary between, for example, UE 110 and call center system 140, the agent stream provided to external recording system 130 may include some or all of the correspondence between UE 110 and call center system 140.

As discussed above, while FIG. 9 shows a particular number and arrangement of operations, in alternative implementations, communication session recording solution 900 may include additional operations, fewer operations, different operations, or differently arranged operations than those depicted. For example, as discussed above with respect to FIGS. 6-7, communication session recording solution 900 may include one or more operations corresponding to IVR recording system 120 recording the IVR portion of the communication session and communicating IVR capture data and/or session metadata to external recording system 130. Additionally, in some implementations, IVR recording system 120, external recording system 130, and/or call center system 140 may use CTI messages for communicating the data and messages discussed above.

FIG. 10 is a diagram of another example of a communication session recording solution 1000 according to one or more implementations described herein. While FIG. 10 shows a particular number and arrangement of systems, in alternative implementations, communication session recording solution 1000 may include additional systems, fewer systems, different systems, or differently arranged systems than those depicted. For instance, communication session recording solution 1000 may also include UE 110, recording management system 210, client device 205, or one or more other types of systems or devices.

At or near the beginning of a communication session, IVR recording system 120 may communicate session metadata and a URI request to external recording system 130. Session metadata and URI requests are described above. Upon receiving a URI, as requested, IVR recording system 120 may begin streaming an IVR portion of the communication session to external recording system 130. At or near, the end of the IVR portion of the communication session, IVR recording system 120 may communicate session metadata (e.g., out-dial data) and/or another URI request to external recording system 130. External recording system 130 may respond by providing the requested URI. As depicted, IVR recording system 120 may use the URI to stream the agent portion of the communication session to the external recording system 130. Additionally, or alternatively, IVR recording system 120 may out-dial the communication session to call center system 140. At or near the beginning of the agent stream and agent portion of the communication session, call center system 140 may communicate agent/CTI data to external recording system 130. Also, as mentioned above, since IVR recording system 120 may act as a session intermediary between, for example, UE 110 and call center system 140, the agent stream provided to external recording system 130 may include some or all of the correspondence between UE 110 and call center system 140.

As discussed above, while FIG. 10 shows a particular number and arrangement of operations, in alternative implementations, communication session recording solution 1000 may include additional operations, fewer operations, different operations, or differently arranged operations than those depicted. For example, in some implementations, IVR recording system 120, external recording system 130, and/or call center system 140 may use CTI messages for communicating the data and messages discussed above.

Accordingly, in one or more implementations described herein, computing devices may be used to, for example, record automated and agent portions of a communication session (e.g., a call session, a telephone call, etc.). In certain implementations, IVR recording system 120 may establish a communication session with UE 110 and enable an IVR portion of the communication session to be recorded. IVR recording system 120 may also, or alternatively, out-dial an agent portion of the communication session and/or enable the agent portion of the communication session to be recorded. The recordings of the IVR portion and agent portion of the communication session may be communicated to recording system 130.

The foregoing description of implementations provides illustration and description, but is not intended to be exhaustive or to limit the implementations to the precise form disclosed. Modifications and variations are possible in light of the above teachings or may be acquired from practice of these implementations.

For example, while series of blocks have been described with regard to FIG. 5, the order of the blocks may be modified in other implementations. Further, non-dependent blocks may be performed in parallel.

It will be apparent that example aspects, as described above, may be implemented in many different forms of software, firmware, and/or hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a "component" that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    establishing, by an interactive voice response (IVR) system device, a communication session with a user equipment device (UE);
    interacting, by the IVR system device and during a first portion of the communication session, with the UE via IVR services;
    enabling, by the IVR system device, the first portion of the communication session to be recorded using a first recording mode,
        enabling the first portion of the communication session to be recorded using the first recording mode including:
            recording, by the IVR system device, the first portion of the communication session, and
            communicating the recording of the first portion of the communication session to an external recording system;
    out-dialing, by the IVR system device, a second portion of the communication session to a call center device,
        the call center device being different from the external recording system;
    streaming, by the IVR system device, the second portion of the communication session to the external recording system to enable the second portion of the communication session to be recorded using a second recording mode; and generating session metadata associating the first portion of the communication session with the second portion of the communication session.

2. The method of claim 1, where streaming the second portion of the communication session includes:
    splitting a data stream, corresponding to the second portion of the communication session, and
    streaming the second portion of the communication the session to the external recording system based on splitting the data stream.

3. The method of claim 1, further comprising:
    communicating session metadata, session, to the external recording system.

4. The method of claim 1, where streaming the second portion of the communication session includes:
    enabling a computing device to create a communication session tap corresponding to the second portion of the communication session,
        where the communication session tap is directed to the external recording system.

5. The method of claim 4, further comprising:
    communicating the session metadata.

6. The method of claim 1, where streaming the second portion of the communication session includes:
    copying a data stream corresponding to the second portion of the communication session; and
    streaming the copied data stream to the external recording system.

7. The method of claim 1, where enabling the first portion of the communication session to be recorded using the first recording mode further includes:
    providing a data stream corresponding to the first portion of the communication session to the external recording system.

8. One or more non-transitory computer-readable storage media storing instructions, the instructions comprising:
    one or more instructions that, when executed by a processor of an interactive voice response (IVR) system, cause the processor to establish a communication session with a user equipment device (UE);
    one or more instructions that, when executed by the processor, cause the processor to interact, during a first portion of the communication session, with the UE via IVR services;
    one or more instructions that, when executed by the processor, cause the processor to enable the first portion of the communication session to be recorded using a first recording mode,
        the one or more instructions that cause the processor to enable the first portion of the communication session to be recorded using the first recording mode further including:
            one or more instructions that cause the processor to record the first portion of the communication session locally at the IVR system, and
            one or more instructions that cause the processor to communicate the recording of the first portion of the communication session to an external recording system;
    one or more instructions that, when executed by the processor, cause the processor to out-dial a second portion of the communication session to a call center device;
    one or more instructions that, when executed by the processor, cause the processor to stream the second portion of the communication session to the external recording system; and
    one or more instructions that, when executed by the processor, cause the processor to generate session metadata corresponding to the communication session,
        the session metadata associating the first portion of the communication session with the second portion of the communication session.

9. The one or more non-transitory computer-readable storage media of claim 8, where the one or more instructions to stream the second portion of the communication session include:
    one or more instructions that, when executed by the processor, cause the processor to:
        record the second portion of the communication session, and
        communicate a recording of the second portion of the communication session to the external recording system.

10. The one or more non-transitory computer-readable storage media of claim 8, where the one or more instructions to stream the second portion of the communication session include:
    one or more instructions that, when executed by the processor, cause the processor to:
        enable a computing device to create a communication session tap corresponding to the second portion of the communication session,
            where the communication session tap is directed to the external recording system, and
        stream the second portion of the communication session to the external recording system using the communication session tap.

11. The one or more non-transitory computer-readable storage media of claim 8, where the one or more instructions to stream the second portion of the communication session include:
    one or more instructions that, when executed by the processor, cause the processor to:
        copy a data stream corresponding to the second portion of the communication session, and stream the copy of the data stream to the external recording system.

12. The one or more non-transitory computer-readable storage media of claim 8, where the one or more instructions to enable the first portion of the communication session to be recorded using the first recording mode further include:
one or more instructions that, when executed by the processor, cause the processor to:
provide a data stream corresponding to the first portion of the communication session to the external recording system.

13. A computing device, comprising:
a memory for storing instructions; and
a processor, connected to the memory, to:
establish a communication session with a user equipment device (UE);
interact, during a first portion of the communication session, with the UE via interactive voice response (IVR) services;
enable the first portion of the communication session to be recorded using a first recording mode,
when enabling the first portion of the communication session to be recorded using the first recording mode, the processor is is further configured to:
record the first portion of the communication session at the computing device, and
communicate a recording of the first portion of the communication session to an external recording system;
out-dial a second portion of the communication session to a call center device;
stream the second portion of the communication session to the external recording system to enable the second portion of the communication session to be recorded using a second recording mode;
generate session metadata corresponding to the communication session; and
communicate the session metadata to the external recording system,
the session metadata associating the first portion of the communication session with the second portion of the communication session.

14. The computing device of claim 13, where, when streaming the second portion of the communication session, the processor is to:
record the second portion of the communication session locally at the computing device, and
stream a recording of the second portion of the communication session to the external recording system.

15. The computing device of claim 13, where the computing device comprises a first computing device, and
where, when streaming the second portion of the communication session, the processor is to:
enable a second computing device to create a communication session tap corresponding to the second portion of the communication session,
where the communication session tap is directed to the external recording system.

16. The computing device of claim 13, where, when streaming the second portion of the communication session, the processor is to:
split a data stream corresponding to the second portion of the communication session, and
stream, based on splitting the data stream, the data stream to the external recording system.

17. The computing device of claim 13, where, when enabling the first portion of the communication session to be recorded using the first recording mode, the processor is to:
provide a data stream corresponding to the first portion of the communication session to the external recording system.

18. The method of claim 1, where recording the first portion of the communication session includes:
recording the first portion of the communication session using an IVR recording system that is associated with the IVR system device.

19. The one or more non-transitory computer-readable storage media of claim 8, where the one or more instructions to record the first portion of the communication session include:
one or more instructions that, when executed by the processor, cause the processor to:
record the first portion of the communication session using an IVR recording system that is associated with the processor.

20. The computing device of claim 13, where, when recording the first portion of the communication session, the processor is to:
record the first portion using an IVR recording system that is associated with the computing device.

* * * * *